(12) United States Patent
Daniel

(10) Patent No.: US 9,815,135 B2
(45) Date of Patent: Nov. 14, 2017

(54) SYSTEMS AND METHODS PROVIDING LOCATION FEEDBACK FOR ADDITIVE MANUFACTURING

(71) Applicant: Lincoln Global, Inc., City of Industry, CA (US)

(72) Inventor: Joseph A. Daniel, Sagamore Hills, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 981 days.

(21) Appl. No.: 14/134,188

(22) Filed: Dec. 19, 2013

(65) Prior Publication Data

US 2015/0108096 A1    Apr. 23, 2015

Related U.S. Application Data

(60) Provisional application No. 61/894,035, filed on Oct. 22, 2013.

(51) Int. Cl.
| | |
|---|---|
| *B23K 9/10* | (2006.01) |
| *B23K 9/04* | (2006.01) |
| *B23K 9/095* | (2006.01) |
| *B23K 9/12* | (2006.01) |

(52) U.S. Cl.
CPC .......... *B23K 9/044* (2013.01); *B23K 9/0953* (2013.01); *B23K 9/0956* (2013.01); *B23K 9/126* (2013.01)

(58) Field of Classification Search
CPC .... B23K 9/044; B23K 9/0953; B23K 9/0956; B23K 9/126
USPC ................. 219/76.16, 76.12, 76.1
See application file for complete search history.

(56) References Cited

U.S. PATENT DOCUMENTS

| | | | |
|---|---|---|---|
| 4,302,656 | A | 11/1981 | Poth et al. |
| 4,525,619 | A | 6/1985 | Ide et al. |
| 4,531,192 | A | 7/1985 | Cook |
| 4,650,957 | A | 3/1987 | Cullen et al. |
| 4,827,213 | A | 5/1989 | Spaude |
| 5,233,150 | A | 8/1993 | Schneebeli et al. |

(Continued)

FOREIGN PATENT DOCUMENTS

| | | |
|---|---|---|
| JP | 60191668 | 9/1985 |
| JP | S60 191688 A | 9/1985 |

(Continued)

OTHER PUBLICATIONS

International Search Report and Written Opinion of the International Searching Authority; PCT/IB2014/001627; dated Feb. 24, 2015.

*Primary Examiner* — Omar Flores Sanchez
(74) *Attorney, Agent, or Firm* — David Muzilla

(57) ABSTRACT

A system and method to correct for height error during a robotic welding additive manufacturing process. One or both of a welding output current and a wire feed speed are sampled during a robotic welding additive manufacturing process when creating a current weld layer. A plurality of instantaneous contact tip-to-work distances (CTWD's) are determined based on at least one or both of the welding output current and the wire feed speed. An average CTWD is determined based on the plurality of instantaneous CTWD's. A correction factor is generated, based on at least the average CTWD, which is used to compensate for any error in height of the current weld layer.

20 Claims, 10 Drawing Sheets

(56) References Cited

U.S. PATENT DOCUMENTS

| | | | |
|---|---|---|---|
| 6,335,511 B1 | 1/2002 | Rothermel | |
| 6,794,608 B2 | 9/2004 | Flood et al. | |
| 6,940,037 B1 * | 9/2005 | Kovacevic | B23K 9/044 |
| | | | 219/121.45 |
| 7,309,400 B2 | 12/2007 | White | |
| 8,006,891 B2 | 8/2011 | Osicki | |
| 8,367,962 B2 * | 2/2013 | Zaffino | B23K 9/044 |
| | | | 219/76.1 |
| 9,292,016 B2 * | 3/2016 | Zaffino | B23K 9/12 |
| 2011/0198331 A1 | 8/2011 | Shigeyoshi | |

FOREIGN PATENT DOCUMENTS

| | | |
|---|---|---|
| WO | 2011027238 | 3/2011 |
| WO | WO2011027238 A1 | 3/2011 |
| WO | WO2013117987 A2 | 8/2013 |

\* cited by examiner

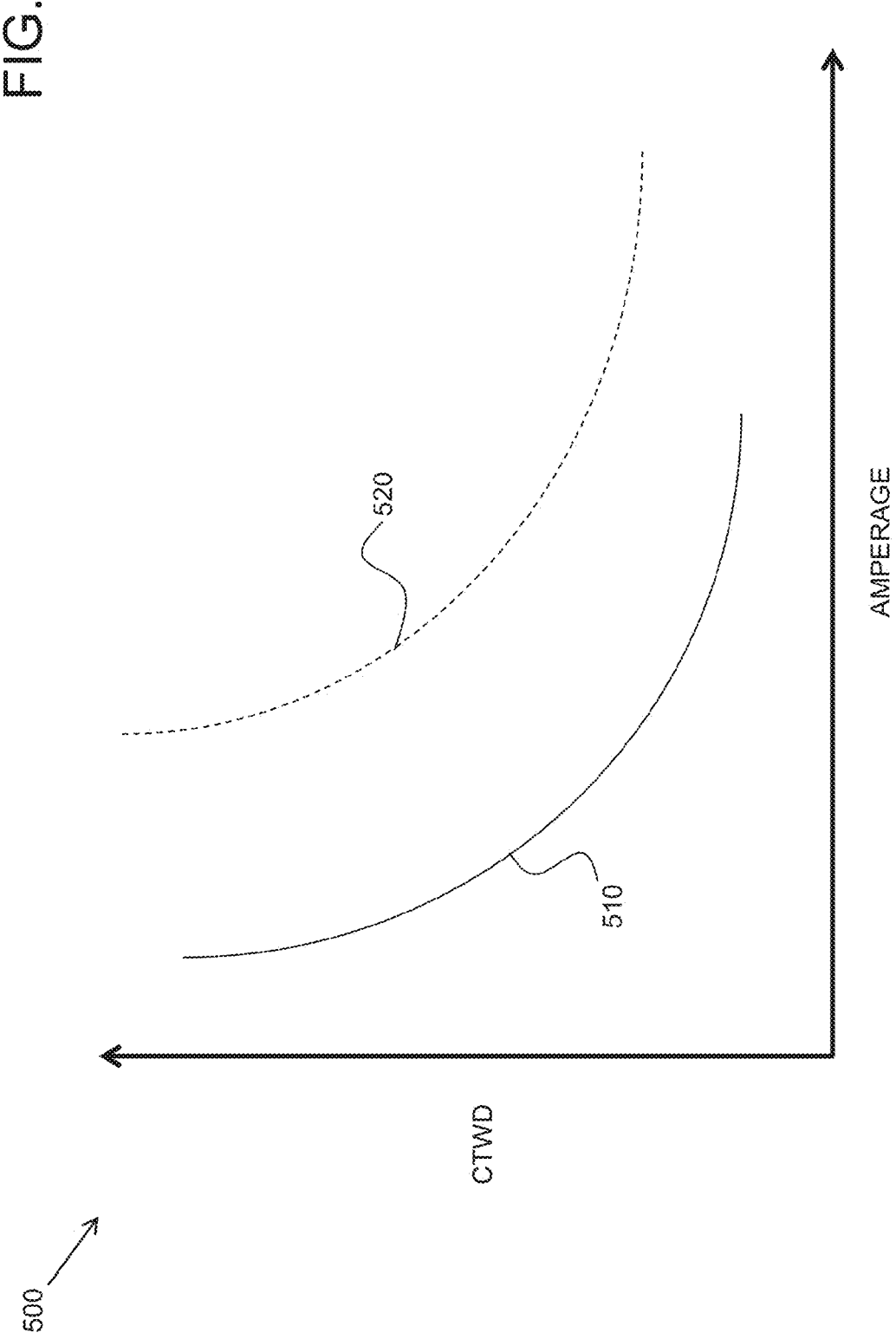

SYSTEMS AND METHODS PROVIDING LOCATION FEEDBACK FOR ADDITIVE MANUFACTURING

This U.S. patent application claims the benefit of and priority to U.S. provisional patent application Ser. No. 61/894,035 filed on Oct. 22, 2013 which is incorporated herein by reference in its entirety.

TECHNICAL FIELD

Certain embodiments of the present invention relate to arc welding. More particularly, certain embodiments of the present invention relate to systems and methods providing location feedback for a robotic welding additive manufacturing process.

BACKGROUND

During a robotic welding additive manufacturing process, successive layers of metal material are build up to create a workpiece part. A robotic welding unit is used to build-up the workpiece part, layer-by-layer, over time as commanded by a robot controller of the robotic welding unit. The robot controller may include software that reads a 3D model of the workpiece part to be created using an additive (layer-by-layer) manufacturing process. The robot controller programmatically splits the 3D model into a plurality of layers and plans a welding path for each of the individual layers to perform the build-up of the part. An expected weld deposition is determined for each layer, resulting in an expected height for each deposited layer. However, as actual layer-by-layer welding proceeds, the actual resultant height for any given layer may deviate from the expected or desired height, due to factors such as, for example, surface conditions of the workpiece part substrate (e.g., temperature or position on substrate) and the accuracy with which certain welding parameters can be controlled. The average contact tip-to-work distance may be one of a simple mathematical average of the instantaneous contact tip-to-work distances determined for the current weld layer, a weighted average of the instantaneous contact tip-to-work distances determined for the current weld layer, or a running average of the instantaneous contact tip-to-work distances determined for the current weld layer.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY

A system and method to correct for height error during a robotic welding additive manufacturing process are provided. One or both of a welding output current and a wire feed speed are sampled during a robotic welding additive manufacturing process when creating a current weld layer. A plurality of instantaneous contact tip-to-work distances (CTWD's) are determined based on at least one or both of the welding output current and the wire feed speed. An average CTWD is determined based on the plurality of instantaneous CTWD's. A correction factor is generated, based on at least the average CTWD, which is used to compensate for any error in height of the current weld layer.

In one embodiment, a welding system is provided having a welding power source. The welding power source is configured to: sample, in real time, instantaneous parameter pairs of welding output current and wire feed speed during a robotic welding additive manufacturing process for creating a current weld layer of a 3D workpiece part; determine an instantaneous contact tip-to-work distance for, and based on at least, each parameter pair of the instantaneous parameter pairs sampled during creation of the current weld layer; determine an average contact tip-to-work distance based on each instantaneous contact tip-to-work distance determined for the current weld layer; and generate a correction factor to be used when creating a next weld layer of the 3D workpiece part based on at least the average contact tip-to-work distance.

In one embodiment, a welding system is provided having a welding power source. The welding power source is configured to: sample, in real time, instantaneous parameter pairs of welding output current and wire feed speed during a robotic welding additive manufacturing process for creating a current weld layer of a 3D workpiece part; determine, in real time, an instantaneous contact tip-to-work distance for, and based on at least, each parameter pair of the instantaneous parameter pairs sampled during creation of the current weld layer; determine, in real time, a running average of contact tip-to-work distance as each instantaneous contact tip-to-work distance is determined during creation of the current weld layer; and adjust, in real time, one or more of a weld duration or a wire feed speed during creation of the current weld layer in response to the running average of contact tip-to-work distance.

Details of illustrated embodiments of the present invention will be more fully understood from the following description and drawings.

BRIEF DESCRIPTION OF THE DRAWINGS

FIG. 5 illustrates an exemplary embodiment of a two-dimensional graph having two plots showing the relationship between CTWD and welding output current (amperage) for two different welding wires, being of the same type but of two different sizes, for an arc welding process at a given wire feed speed when a particular type of welding gas is used;

DETAILED DESCRIPTION

Figure 1:
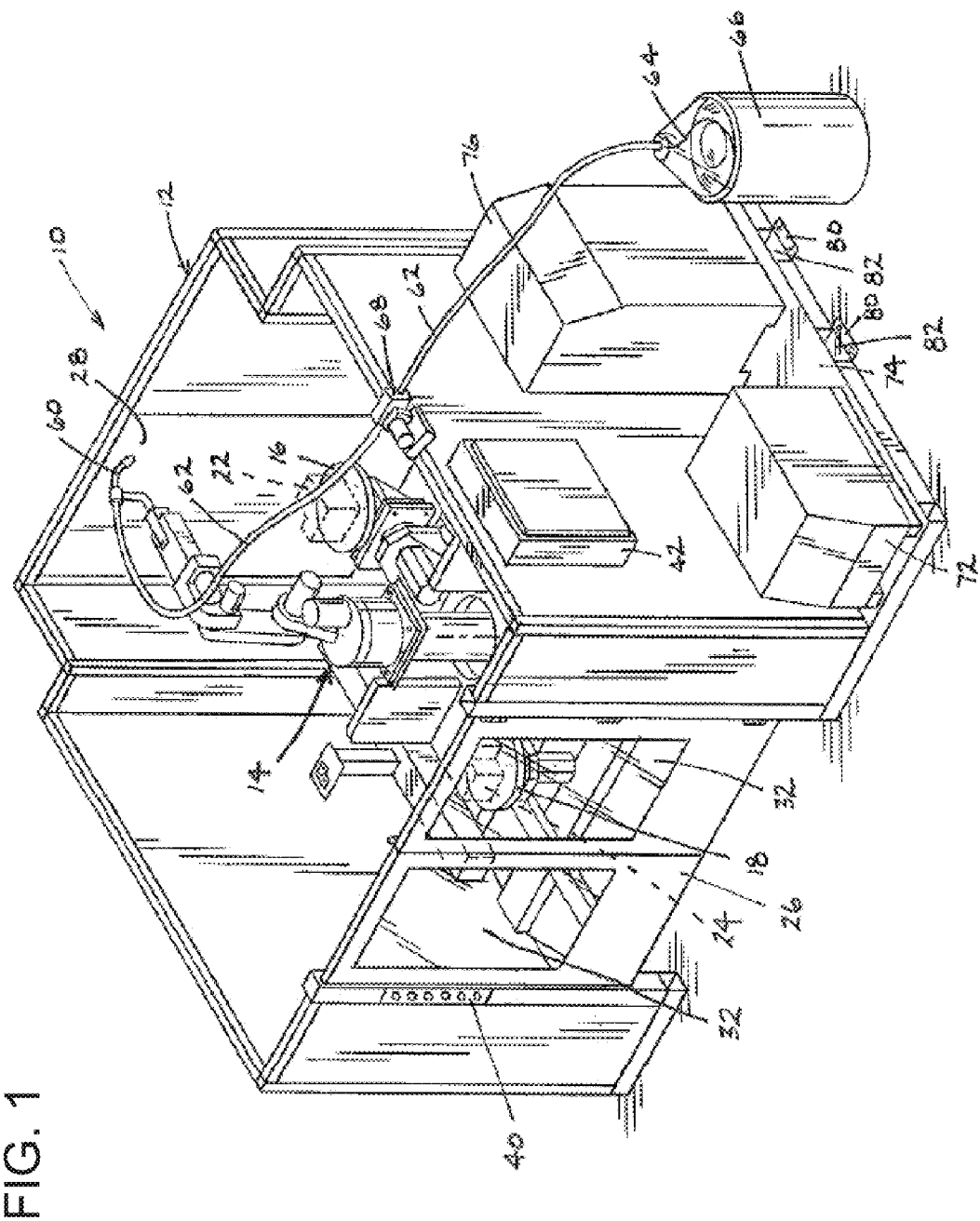
FIG. 1 illustrates a diagram of an exemplary embodiment of a robotic welding cell unit.

The following are definitions of exemplary terms that may be used within the disclosure. Both singular and plural forms of all terms fall within each meaning:

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processing element" or "computer device" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk.

"Welding tool", as used herein, refers to, but is not limited to, a welding gun, a welding torch, or any welding device that accepts a consumable welding wire for the purpose of applying electrical power to the consumable welding wire provided by a welding power source.

"Welding output circuit path", as used herein, refers to the electrical path from a first side of the welding output of a welding power source, through a first welding cable (or a first side of a welding cable), to a welding electrode, to a workpiece (either through a short or an arc between the welding electrode and the workpiece), through a second welding cable (or a second side of a welding cable), and back to a second side of the welding output of the welding power source.

"Welding cable", as used herein, refers to the electrical cable that may be connected between a welding power source and a welding electrode and workpiece (e.g. through a welding wire feeder) to provide electrical power to create an arc between the welding electrode and the workpiece.

"Welding output", as used herein, may refer to the electrical output circuitry or output port or terminals of a welding power source, or to the electrical power, voltage, or current provided by the electrical output circuitry or output port of a welding power source.

"Computer memory", as used herein, refers to a storage device configured to store digital data or information which can be retrieved by a computer or processing element.

"Controller", as used herein, refers to the logic circuitry and/or processing elements and associated software or program involved in controlling a welding power source or a welding robot.

The terms "signal", "data", and "information" may be used interchangeably herein and may be in digital or analog form.

The term "welding parameter" is used broadly herein and may refer to characteristics of a portion of a welding output current waveform (e.g., amplitude, pulse width or duration, slope, electrode polarity), a welding process (e.g., a short arc welding process or a pulse welding process), wire feed speed, a modulation frequency, or a welding travel speed.

With reference to FIG. 1, a robotic welding cell unit 10 generally includes a frame 12, a robot 14 disposed within the frame, and a welding table 16 also disposed within the frame. The robotic welding cell unit 10 is useful for building up a workpiece part 22 on a substrate through an additive manufacturing process, as described in more detail below herein.

In the depicted embodiment, the frame 12 includes a plurality of side walls and doors to enclose the robot 14 and the welding table 16. Even though a substantially rectangular configuration is shown in a plan view, the frame 12, and the unit 10, can take numerous configurations.

A front access door 26 mounts to the frame 12 to provide access to the interior of the frame. Similarly, a rear access door 28 also mounts to the frame 12. Windows 32 can be provided on either door (only depicted on front door 26). The windows can include a tinted safety screen, which is known in the art.

A control panel 40 is provided on the frame 12 adjacent the front door 26. Control knobs and/or switches provided on the control panel 40 communicate with controls housed in a controls enclosure 42 that is also mounted to the frame 12. The controls on the control panel 40 can be used to control operations performed in the unit 10 in a similar manner to controls used with known welding cell units.

In accordance with an embodiment, the robot 14 is mounted on a pedestal that mounts on a support (not shown). The robot 14 used in the depicted embodiment can be an ARC Mate® 100/Be robot available from FANUC Robotics America, Inc. Other similar robots can also be used. The robot 14 in the depicted embodiment is positioned with respect to the welding table 16 and includes eleven axes of movement. If desired, the pedestal (not shown) can rotate with respect to the support (not shown) similar to a turret. Accordingly, some sort of drive mechanism, e.g. a motor and transmission (not shown), can be housed in the pedestal and/or the support for rotating the robot 14.

A welding gun 60 attaches to a distal end of the robot arm 14. The welding gun 60 can be similar to those that are known in the art. A flexible tube or conduit 62 attaches to the welding gun 60. Consumable welding electrode wire 64, which can be stored in a container 66, is delivered to the welding gun 60 through the conduit 62. A wire feeder 68, which can be a PF 10 R-II wire feeder available from The Lincoln Electric Company for example, attaches to the frame 12 to facilitate the delivery of welding wire 64 to the welding gun 60.

Even though the robot 14 is shown mounted to a base or lower portion of the frame 12, if desired, the robot 14 can mount in a similar manner as the robot disclosed in U.S. Pat. No. 6,772,932. That is, the robot can mount to an upper structure of the frame and extend downwardly into the cell unit 10.

With reference back to the embodiment depicted in FIG. 1, a welding power source 72 for the welding operation mounts to and rests on a platform 74 that is connected to and can be a part of the frame 12. The welding power source 72 in the depicted embodiment is a PW 455 M (non STT) available from The Lincoln Electric Company; however, other suitable power sources can be used for the welding operation. A robot controller 76, which controls the robot 14, also rests and mounts on the platform 74. The robot controller typically accompanies the robot 14.

The robotic welding cell unit 10 may also include a shielding gas supply (not shown). During operation, the wire feeder 68, the welding gun 60, the shielding gas supply, and the welding power source 72 are operatively connected to allow an electric arc to be created between a welding wire and a workpiece part 22 to create a weld layer as is well known in the art. In accordance with an embodiment, shielding gases may be used during a gas metal arc welding (GMAW) process to protect the welding region from atmospheric gases such as oxygen or nitrogen, for example. Such atmospheric gases may cause various weld metal defects such as, for example, fusion defects, embrittlement, and porosity.

The type of shielding gas, or combination of shielding gases used depend on the material being welded and the welding process. The rate of flow of the shielding gas to be provided depends on the type of shielding gas, the travel speed, the welding current, the weld geometry, and the metal transfer mode of the welding process. Inert shielding gases include argon and helium. However, there may be situations when it is desirable to use other shielding gases or combinations of gases such as, for example, carbon dioxide ($CO_2$) and oxygen. In accordance with an embodiment, a shielding gas may be fed to a welding tool during an arc welding process such that the welding tool disperses the shielding gas to the weld region during the welding process.

Selection of a welding wire or electrode is dependent on the composition of the workpiece part being additively welded, the welding process, the configuration of the weld layer, and the surface conditions of the workpiece part substrate. Welding wire selection may largely affect the mechanical properties of the resultant weld layers and may be a main determinant of weld layer quality. It may be desirable for the resultant weld metal layers to have mechanical properties like those of the base substrate material, without defects such as discontinuities, contaminants, or porosity.

Existing welding wire electrodes often contain deoxidizing metals such as silicon, manganese, titanium, and aluminum in relatively small percentages to help prevent oxygen porosity. Some electrodes may contain metals such as titanium and zirconium to avoid nitrogen porosity. Depending on the welding process and base substrate material being welded upon, the diameters of the electrodes used in gas metal arc welding (GMAW) typically range from 0.028-0.095 inches, but may be as large as 0.16 inches. The smallest electrodes, generally up to 0.045 inches in diameter, may be associated with a short-circuit metal transfer process, while electrodes used for spray-transfer processes may be at least 0.035 inches in diameter.

Figure 2:
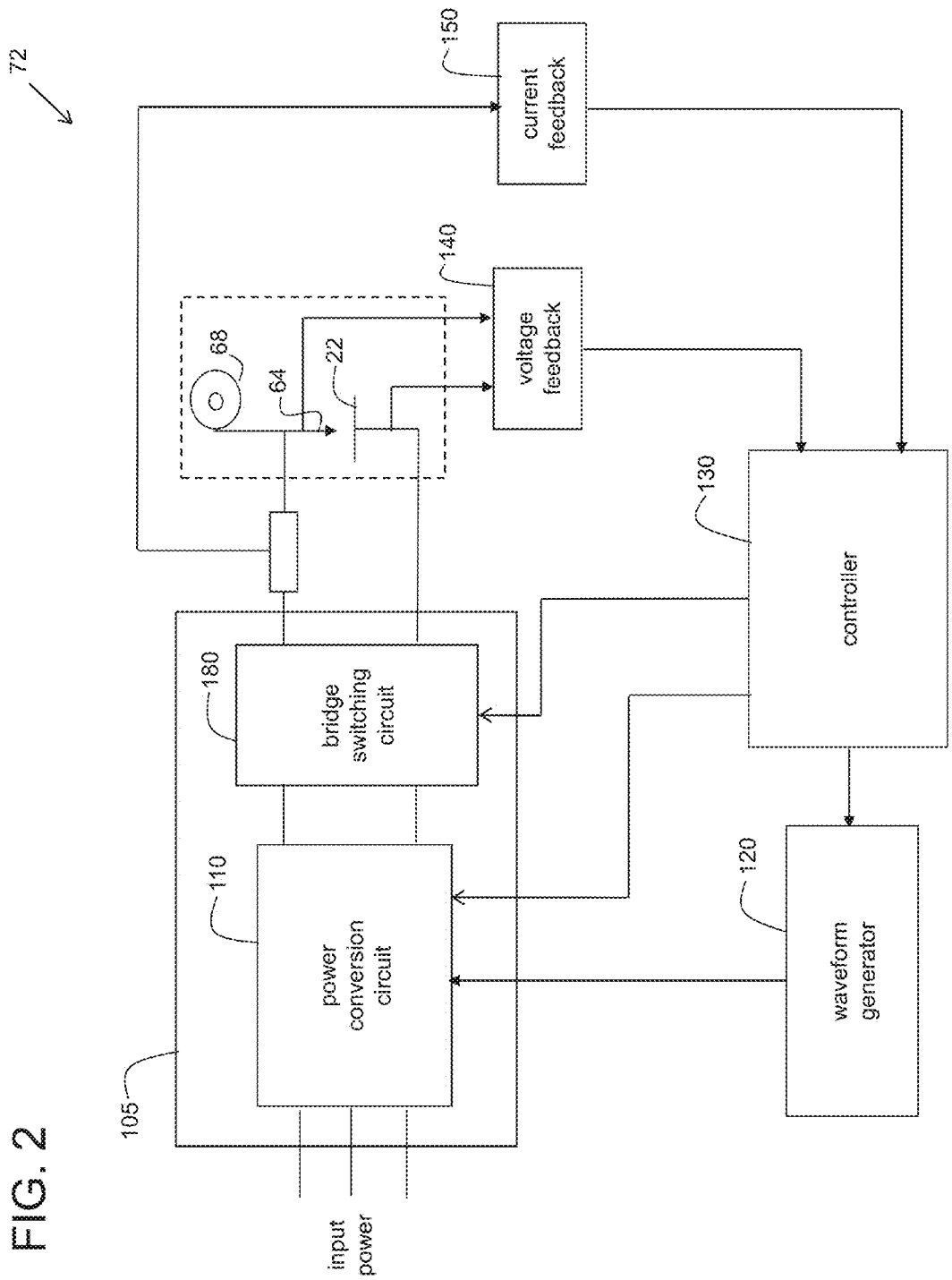
FIG. 2 illustrates a schematic block diagram of an exemplary embodiment of the welding power source of the robotic welding cell unit of FIG. 1 operatively connected to a consumable welding electrode and a workpiece part.

FIG. 2 illustrates a schematic block diagram of an exemplary embodiment of the welding power source 72 of the robotic welding cell unit 10 of FIG. 1 operatively connected to a consumable welding electrode 64 and a workpiece part 22. The welding power source 72 includes a switching power supply 105 having a power conversion circuit 110 and a bridge switching circuit 180 providing welding output power between the welding electrode 64 and the workpiece part 22. The power conversion circuit 110 may be transformer based with a half bridge output topology. For example, the power conversion circuit 110 may be of an inverter type that includes an input power side and an output power side, for example, as delineated by the primary and secondary sides, respectively, of a welding transformer. Other types of power conversion circuits are possible as well such as, for example, a chopper type having a DC output topology. The power source 100 also includes a bridge switching circuit 180 that is operatively connected to the power conversion circuit 110 and is configured to switch a direction of the polarity of the welding output current (e.g., for AC welding).

The power source 72 further includes a waveform generator 120 and a controller 130. The waveform generator 120 generates welding waveforms at the command of the controller 130. A waveform generated by the waveform generator 120 modulates the output of the power conversion circuit 110 to produce the welding output current between the electrode 64 and the workpiece part 22. The controller 130 also commands the switching of the bridge switching circuit 180 and may provide control commands to the power conversion circuit 110.

The welding power source 72 further includes a voltage feedback circuit 140 and a current feedback circuit 150 to monitor the welding output voltage and current between the electrode 64 and the workpiece part 22 and provide the monitored voltage and current back to the controller 130. The feedback voltage and current may be used by the controller 130 to make decisions with respect to modifying the welding waveform generated by the waveform generator 120 and/or to make other decisions that affect operation of the power source 72, for example. In accordance with an embodiment, the controller 130 is used to determine CTWD during a welding process, and use the CTWD to adjust a weld time duration (WTD) and/or a wire feed speed (WFS), as is discussed in more detail later herein.

In accordance with an embodiment, the switching power supply 105, the waveform generator 120, the controller 130, the voltage feedback circuit 140, and the current feedback circuit 150 constitute the welding power source 72. The robotic welding cell unit 10 also includes a wire feeder 68 that feeds the consumable wire welding electrode 64 toward the workpiece part 22 through the welding gun (welding tool) 60 at a selected wire feed speed (WFS). The wire feeder 68, the consumable welding electrode 64, and the workpiece part 22 are not part of the welding power source 72 but may be operatively connected to the welding power source 72 via one or more welding output cables.

Figure 3:
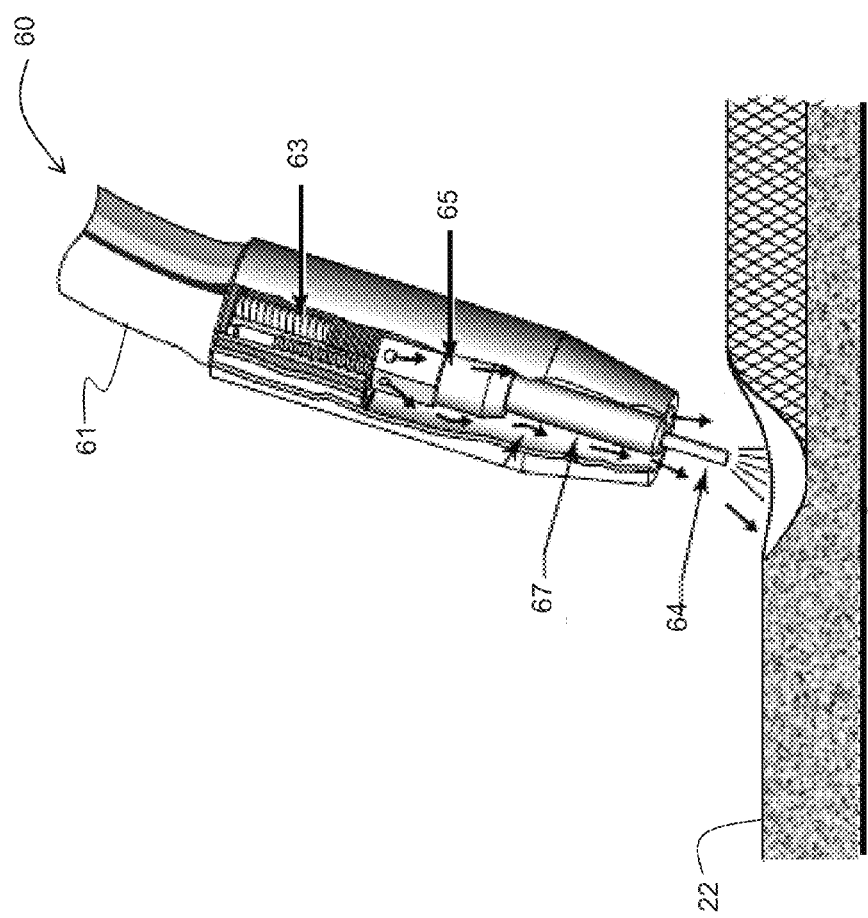
FIG. 3 illustrates a diagram of an exemplary embodiment of a portion of the welding gun of the robotic welding cell unit of FIG. 1 providing a welding wire electrode that interacts with a workpiece part during an additive manufacturing arc welding process.

FIG. 3 illustrates a diagram of an exemplary embodiment of a portion of the welding gun 60 of the robotic welding cell unit 10 of FIG. 1 providing a welding wire electrode 64 that interacts with a workpiece part 22 during an additive manufacturing arc welding process. The welding gun 60 may have an insulated conductor tube 61, an electrode conduit 63, a gas diffuser 65, a contact tip 67, and a wire electrode 64 feeding through the gun 60. A control switch, or trigger, (not shown) when activated by the robot 14, starts the wire feed, electric power, and the shielding gas flow, causing an electric arc to be established between the electrode 64 and the workpiece part 22. The contact tip 67 is electrically conductive and is connected to the welding power source 72 through a welding cable and transmits electrical energy to the electrode 64 while directing the electrode 64 toward the workpiece part 22. The contact tip 67 is secured and sized to allow the electrode 64 to pass while maintaining electrical contact.

The wire feeder 68 supplies the electrode 64 to the workpiece part 22, driving the electrode 64 through the conduit 62 and on to the contact tip 67. The wire electrode 64 may be fed at a constant feed rate, or the feed rate may be varied based on the arc length and the welding voltage. Some wire feeders can reach feed rates as high as 1200 in/min), however, feed rates for semiautomatic GMAW typically range from 75-400 in/min.

On the way to the contact tip 67, the wire electrode 64 is protected and guided by the electrode conduit 63, which helps prevent kinking and maintains an uninterrupted feeding of the wire electrode 64. The gas diffuser 65 directs the shielding gas evenly into the welding zone. A gas hose from the tank(s) of shielding gas supplies the gas to the gas diffuser 65.

Figure 4A:
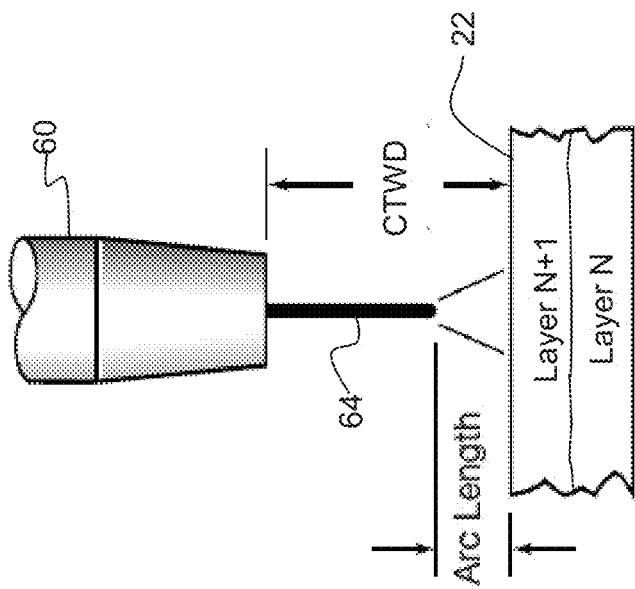
FIGS. 4A and 4B illustrate the concept of contact tip-to-work distance (CTWD) with and without the presence of an arc.
Figure 4B:
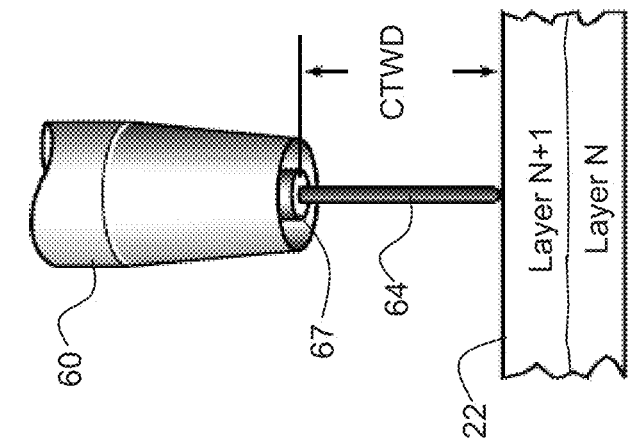

FIGS. 4A and 4B illustrate the concept of contact tip-to-work distance (CTWD) with and without the presence of an arc. In FIG. 4A, the CTWD is shown as the distance between the end of the contact tip 67 and a top layer of the workpiece part 22 with no arc established between the electrode 64 and the workpiece part 22. In FIG. 4B, the CTWD is shown as the distance between the end of the contact tip 67 and the top layer of the workpiece part 22 with an arc established between the electrode 64 and the workpiece part 22. Again, keeping a consistent, desired contact tip-to-work distance (CTWD) during a welding process is important. In general, as CTWD increases, the welding current decreases. A CTWD that is too long may cause the welding electrode to get too hot and may also waste shielding gas. Furthermore, the desired CTWD may be different for different welding processes.

In accordance with an embodiment, the workpiece part 22 is built up, layer-by-layer, over time as commanded by the robot controller 76. The robot controller 76 includes software that reads a 3D model of the workpiece part 22 to be created using an additive (layer-by-layer) manufacturing process. The robot controller 76 programmatically splits the 3D model into a plurality of layers and plans a welding path for each of the individual layers to perform the build-up of the part 22. An expected weld deposition is determined for each layer, resulting in an expected height for each deposited layer. However, as actual layer-by-layer welding proceeds, the actual resultant height for any given layer may deviate from the expected or desired height, due to factors such as, for example, surface conditions of the workpiece part substrate and the accuracy with which certain welding parameters can be controlled. Therefore, in accordance with an embodiment, CTWD is monitored for each layer during the welding process and used to compensate for errors in the height dimension as described below herein in detail.

FIG. 5 illustrates an exemplary embodiment of a two-dimensional graph 500 having two plots 510 and 520 showing the relationship between CTWD and welding output current (amperage) for two different welding wires, being of the same type and fed at the same fixed rate, but being of two different diameters, for an arc welding process when a particular type of welding gas is used. In accordance with an embodiment, the actual instantaneous CTWD during a welding process may be determined in real time by the controller 130 based on the welding output current (amperage), the welding electrode type, the welding electrode diameter, the wire feed speed (WFS), and the shielding gas used. As the CTWD changes in real time during a welding process, the welding output current (amperage) will reflect that change in real time, as defined by the appropriate plot (e.g., 510 or 520). As the actual CTWD changes in real time during the welding process, the controller 130, receiving the welding output current value fed back from the current feedback circuit 150, and already knowing the selected wire electrode type/diameter, shielding gas mixture, and wire feed speed, determines the actual CTWD.

In accordance with an embodiment, plot 510 corresponds to a welding wire electrode, having a diameter of 0.045 inches and being of a mild steel, copper coated type, used in a welding process providing a mixture of 90% argon shielding gas and 10% carbon dioxide shielding gas. Furthermore, in accordance with an embodiment, plot 520 corresponds to a welding wire electrode, having a diameter of 0.052 inches and being of a same mild steel, copper coated type, used in a welding process providing a same mixture of 90% argon shielding gas and 10% carbon dioxide shielding gas. As can be seen from FIG. 5, as the diameter of the welding wire of the same type is changed to an increased diameter, the plot representing the relationship of CTWD vs. amperage moves outward from the origin of the graph 500.

In accordance with various embodiments, the relationship between CTWD and amperage for a combination of welding electrode type, welding electrode diameter, wire feed speed, and shielding gas used may be determined experimentally or through analysis based on theory. Once such a relationship is determined, the relationship may be expressed or stored in the controller 130 as a look-up-table (LUT) or as a mathematical transfer function, for example.

Figure 6:
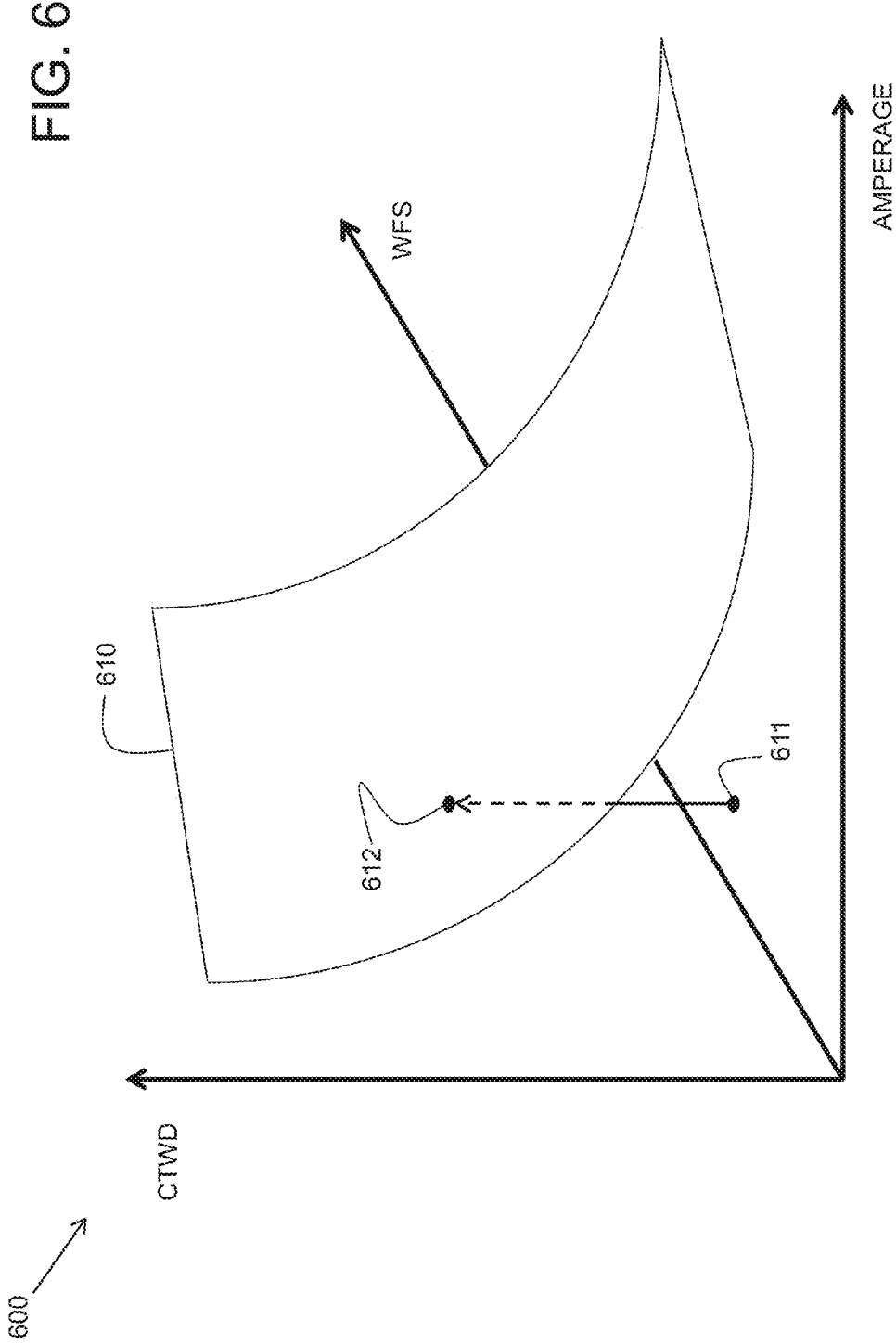
FIG. 6 illustrates an exemplary embodiment of a three-dimensional graph showing the relationship between CTWD, welding output current (amperage), and wire feed speed, being of a particular type and size, for an arc welding process when a particular type of welding gas is provided.

In accordance with an alternative embodiment, the wire feed speed (WFS) may vary during the welding process (e.g., based on the arc length and the welding voltage) and, therefore, the LUT or mathematical transfer function may reflect the effect of a changing wire feed speed on CTWD. For example, FIG. 6 illustrates an exemplary embodiment of a three-dimensional graph 600 showing the relationship between CTWD, welding output current (amperage), and wire feed speed (WFS) for a welding wire, being of a particular type and size, for an arc welding process when a particular type of welding gas is provided. The plot 610 on the graph 600 forms a surface. In accordance with an embodiment, the actual instantaneous CTWD during a welding process may be determined in real time by the controller 130 based on the welding output current (amperage), the wire feed speed, the welding electrode type, the welding electrode diameter, and the shielding gas used.

As the actual CTWD changes in real time during a welding process, the paired welding output current (amperage) and WFS (parameter pair) will reflect that change in real time, as defined by the surface plot 610 of the graph 600. Furthermore, as the actual CTWD changes in real time during the welding process, the controller 130, receiving the welding output current (amperage) value fed back from the current feedback circuit 150 and the WFS value fed back from the wire feeder 68, and already knowing the selected wire electrode type/diameter and shielding gas mixture, determines the actual CTWD. FIG. 6 shows an example of an amperage/WFS parameter pair 611 corresponding to an actual CTWD value 612 as determined by the surface plot 610 of the graph 600. For other combinations of welding electrode type, welding electrode diameter, and shielding gas used, plots of other surfaces will define the relationship of CTWD, WFS, and amperage. In accordance with an alternative embodiment, taking into consideration the welding output voltage as fed back to the controller 130 from the voltage feedback circuit 140 may provide a more accurate determination of actual instantaneous CTWD.

In accordance with various embodiments, the relationship between CTWD, WFS, and amperage for a combination of welding electrode type, welding electrode diameter, and shielding gas used may be determined experimentally or through analysis based on theory. Once such a relationship is determined, the relationship may be expressed or stored in the controller 130 as a look-up-table (LUT) or as a mathematical transfer function expressed in software, for example.

Figure 7:
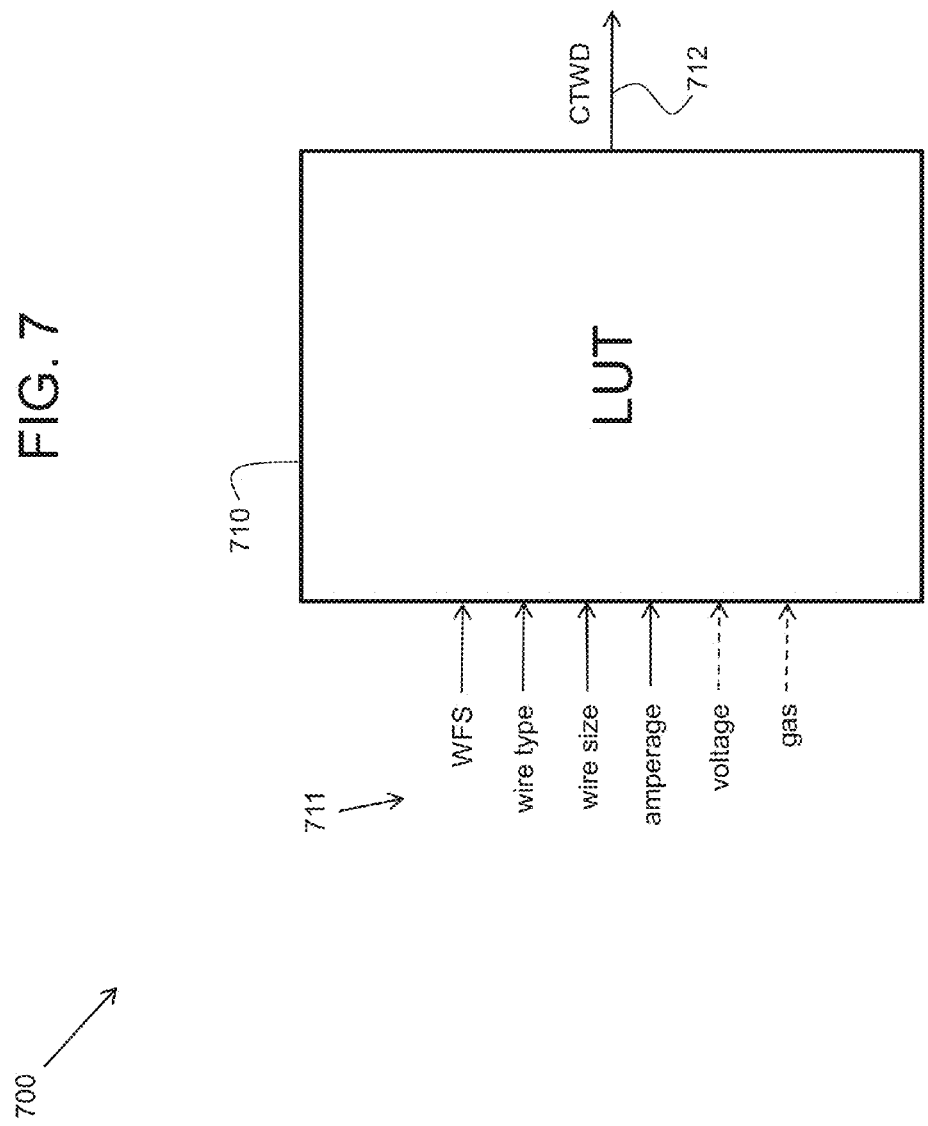
FIG. 7 illustrates an exemplary embodiment of a portion of the controller of the welding power source of FIG. 2 configured to determine an actual, instantaneous CTWD.

FIG. 7 illustrates an exemplary embodiment of a portion 700 of the controller 130 of the welding power source 72 of FIG. 2 configured to determine an actual, instantaneous CTWD. As shown in the embodiment of FIG. 7, a LUT 710 is used to implement the relationship between the inputs 711 (WFS, wire type, wire size, amperage, voltage, and shielding gas) and the output 712 (actual CTWD). The LUT 710 may be implemented in firmware, for example, as an EEPROM. In some embodiments, the inputs of welding output voltage or shielding gas may not be used. For any particular combination of inputs 711, an output 712 representing an actual and instantaneous CTWD, in real time, is produced.

Figure 8:
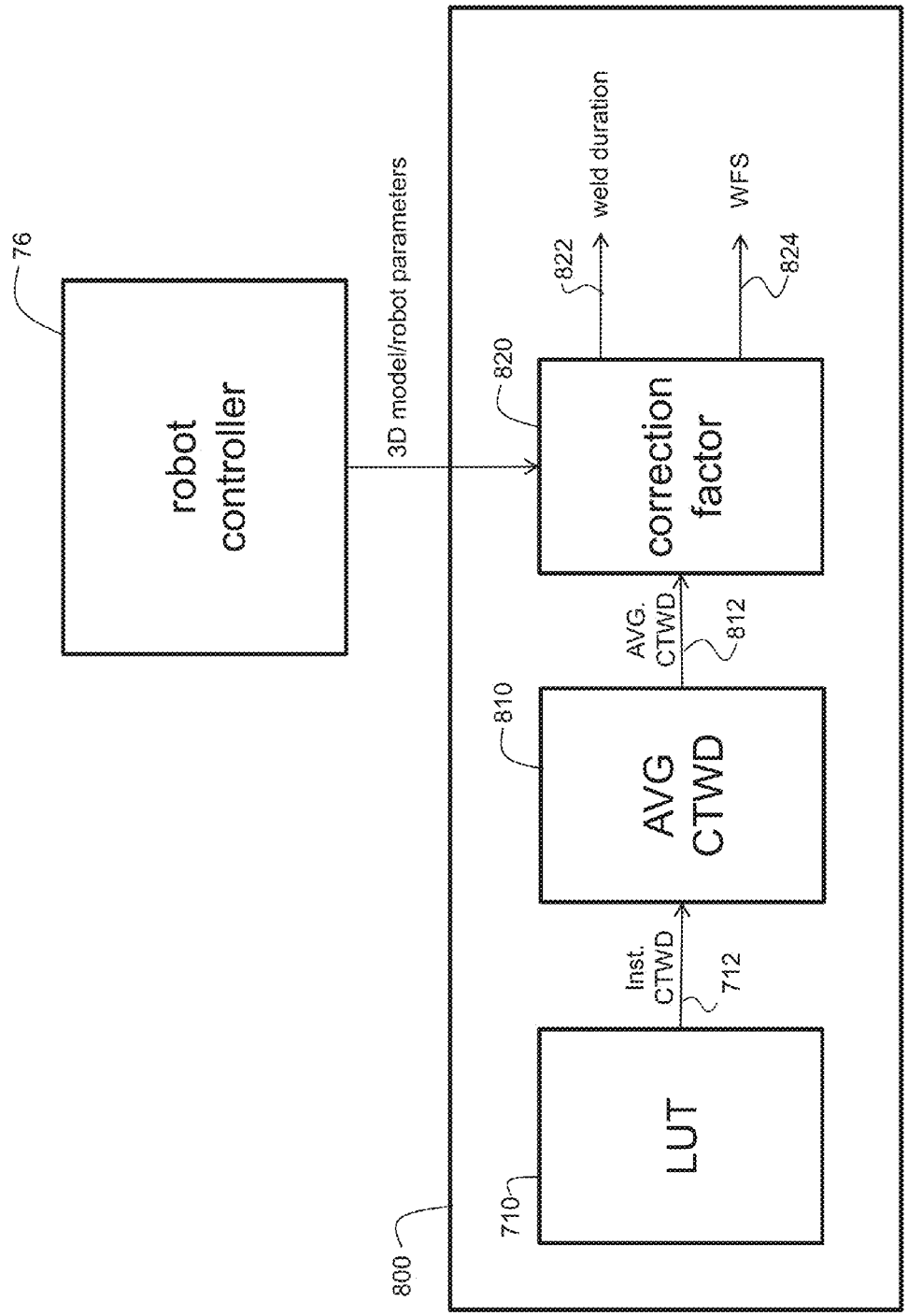
FIG. 8 illustrates an exemplary embodiment of a portion of the controller of the welding power source of FIG. 2 configured to determine an average CTWD over time, from the instantaneous CTWD's, and compute a correction factor.

FIG. 8 illustrates an exemplary embodiment of a portion 800 of the controller 130 of the welding power source 72 of FIG. 2 configured to determine an average CTWD 812 over time, from the CTWD's 712 out of the LUT 710, and compute a correction factor. The correction factor can take the form of a weld duration 822, a wire feed speed (WFS) 824, or both. FIG. 8 also shows the robot controller 76 communicatively interfacing to the portion 800 of the controller 130 of the welding power source 72.

Optionally or alternatively, the correction factor can take the form of a travel speed of the welding gun.

In accordance with an embodiment, when a current weld operation is being performed to create a current weld layer at a current position on the workpiece part 22, a plurality of instantaneous CTWD's 712 is determined during the current weld operation and an average CTWD 812 is computed from the plurality of instantaneous CTWD's 712 for the current weld layer by an averaging module 810. A correction factor (e.g., weld duration 822, WFS 824, or both) for a next weld operation is computed by a correction factor module 820 based on the average CTWD 812 and further based on 3D model/robot parameters corresponding to the next weld operation which are received by the controller 130 from the robot controller 76. The correction factor is used by the welding power source 72 to generate the next weld layer at the next workpiece part position (e.g., the next height position corresponding to the next weld layer) during the next weld operation.

In accordance with an embodiment, the average CTWD can be a simple mathematical average of the instantaneous CTWD's. In another embodiment, the average CTWD can be a weighted average. For example, more weight may be given to the later instantaneous CTWD's (e.g., maybe the last four of the ten). In accordance with still another embodiment, the average CTWD can be a running average, where the total number of samples of instantaneous CTWD's may vary from layer to layer. Other ways of determining average CTWD that work well for different additive manufacturing applications may be possible as well. Therefore, the term "average CTWD" is used in a broad sense herein.

In accordance with an embodiment, the 3D model/robot parameters may include one or more of a designated height of the next weld layer and a designated position of the welding gun 60. By knowing the 3D model/robot parameters for the next weld layer and the average CTWD from the current weld layer, the weld duration and/or the WFS can be increased or decreased for the next weld operation to generate the next weld layer. The averaging module 810 and the correction factor module 820 may be implemented as software and/or hardware in the controller 130, in accordance with various embodiments. For example, implementations as software running on a processor, or as firmware (e.g., a programmed EEPROM), are contemplated. Other implemented embodiments are possible as well (e.g., a digital signal processor).

For example, when the average CTWD 812 for the current weld layer is longer than expected based on the 3D model/robot parameters, this may be an indication that the resultant current weld layer is too short in height (e.g., not enough weld material was deposited to reach the designated height for this layer). Therefore, the weld duration and/or the WFS for the next weld operation can be increased to deposit more weld material for the next weld layer to compensate for the short height of the current weld layer.

Similarly, when the average CTWD for the current weld layer is shorter than expected, this may be an indication that the resultant current weld layer is too high (e.g., too much weld material was deposited, overshooting the designated height for this layer). Therefore, the weld duration and/or the WFS for the next weld operation can be decreased to deposit less weld material for the next weld layer to compensate for the current weld layer. In this manner, by allowing for a next weld layer to compensate for a current weld layer, any error in a resultant overall height of the workpiece part at a particular location, after all weld layers are generated, may be minimized. In accordance with an alternative embodiment, a travel speed of the welding gun may be adjusted (increased or decreased) for a next weld layer to help compensate for a current weld layer.

The relationship between weld duration (and/or wire feed speed), for a next weld layer, and average CTWD may be determined experimentally or through analysis based on theory, in accordance with various embodiments. In general, determination of CTWD is more accurate in a region that produces a larger amperage change for a given change in CTWD (e.g., see FIG. 5).

Figure 9:
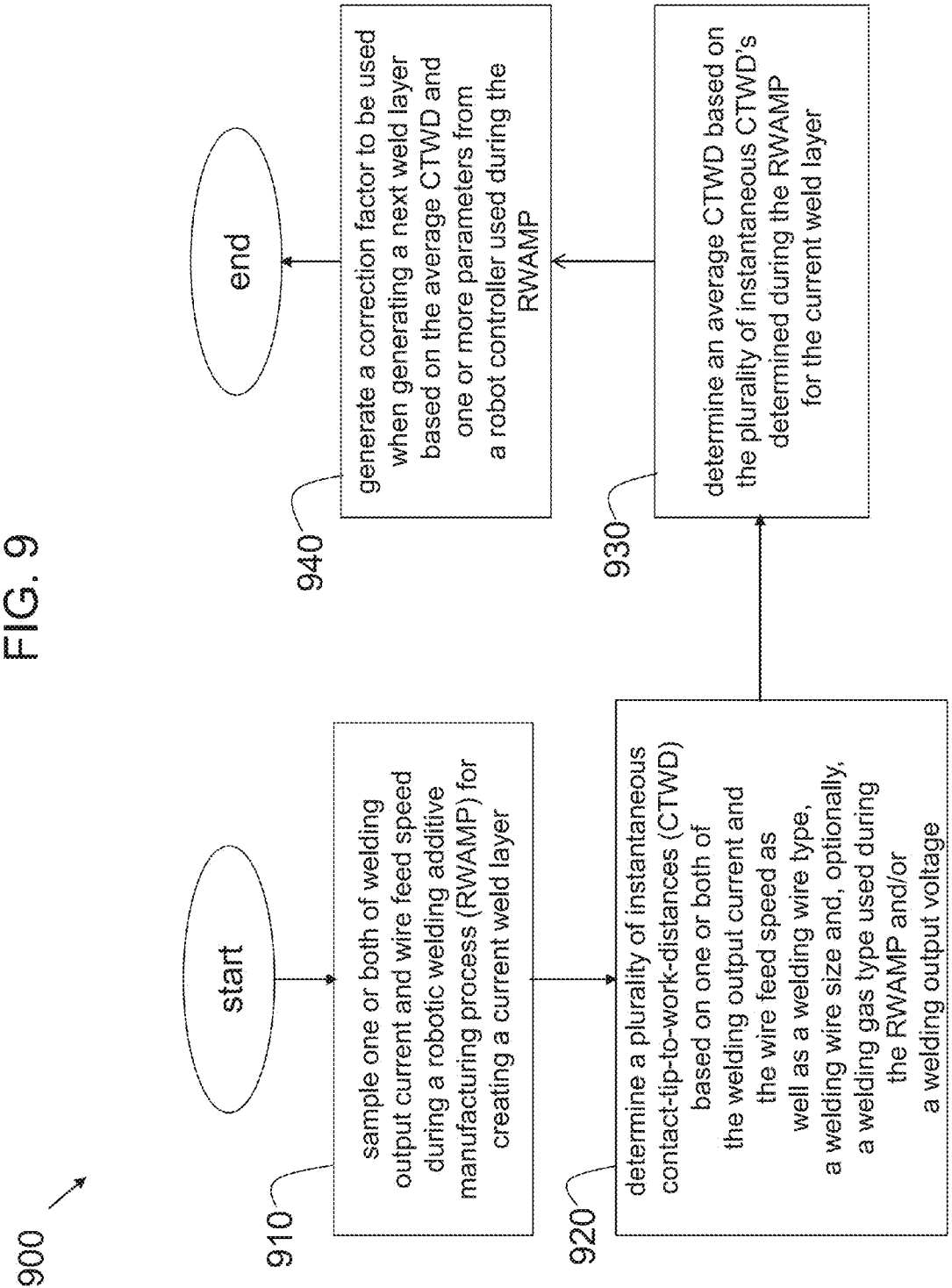
FIG. 9 illustrates a flow chart of an embodiment of a method for correcting for additive manufacturing height error on a layer-by-layer basis during a robotic welding additive manufacturing process (RWAMP)

FIG. 9 illustrates a flow chart of an embodiment of a method 900 for correcting for additive manufacturing height error on a layer-by-layer basis during a robotic welding additive manufacturing process (RWAMP). In step 910, sample one or both of welding output current and wire feed speed during a robotic welding additive manufacturing process for creating a current weld layer. In step 920, determine a plurality of instantaneous contact tip-to-work distances based on one or both of the welding output current and the wire feed speed, as well as a welding wire type, a welding wire size and, optionally, a welding gas type used during the robotic welding additive manufacturing process and/or a welding output voltage. In step 930, determine an average CTWD based on the plurality of instantaneous CTWD's determined during the robotic welding additive manufacturing process for the current weld layer. In step 940, generate a correction factor to be used when generating a next weld layer based on the average CTWD and one or more parameters from a robot controller used to control the robotic welding additive manufacturing process.

Figure 10:
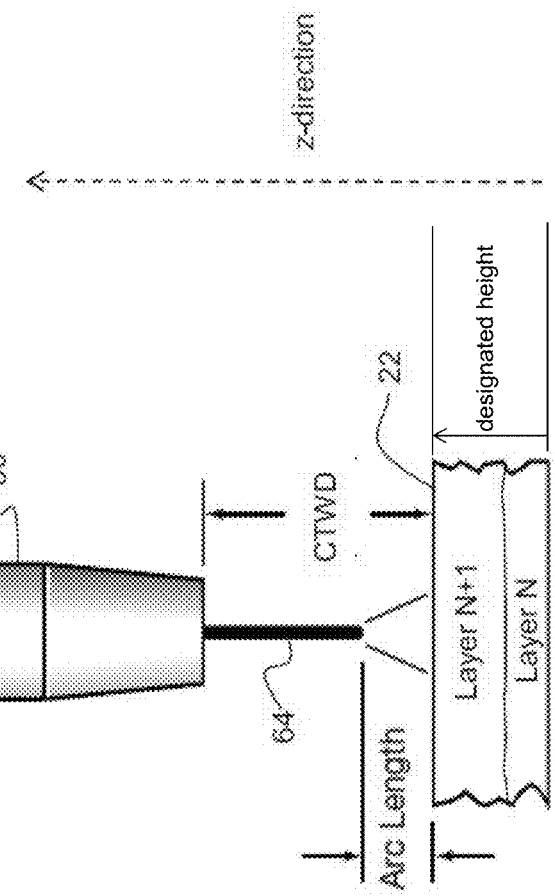
FIG. 10 illustrates an example of a robotic welding additive manufacturing process employing the method of FIG. 9.

FIG. 10 illustrates an example of a robotic welding additive manufacturing process employing the method 900 of FIG. 9. In the process of FIG. 10, each layer of weld material is designated to be 50 mils in height along the z-direction at a designated position on a workpiece substrate, where a mil is a thousandth of an inch. During the deposit of each layer at the designated position, approximately ten (10) samples of instantaneous CTWD are determined as described herein during the weld duration for each layer. Furthermore, the average CTWD is determined from the ten (10) samples of instantaneous CTWD. In accordance with an embodiment, the correction factor for a layer may change or vary as the designated position across that layer changes.

In the example of FIG. 10, the average CTWD for layer N was determined to be longer than expected and the height of layer N ended up being 40 mils instead of the desired 50 mils. As a result, using the process described herein, a correction factor was determined for the next layer N+1 based on at least the average CTWD for layer N, where the weld duration and the wire feed speed were each increased by determined amounts to compensate for the height deficiency of layer N. As a result, the height of layer N+1 ended up being 60 mils, resulting in a total height of 100 mils from the bottom of layer N to the top of layer N+1, as desired. The process may proceed in a similar manner for all layers at the designated position, resulting in a minimized, acceptable error in height at that designated position. Again, in accordance with an embodiment, in addition (or as an alternative) to weld duration and wire feed speed, travel speed may be adjusted to compensate for the current layer. That is, any one or more of weld duration, wire feed speed, or travel speed for a next layer may be adjusted to compensate for a current layer.

As an alternative, a correction factor can be generated in real time for a current welding layer. For example, a running average of instantaneous CTWD's may be computed during a welding process for a current layer. As the running average is monitored, adjustments may be made in the weld duration and/or the wire feed speed in real time for the current weld layer, based on the running average CTWD. In accordance with another embodiment, a combination of the two approaches (i.e., making corrections in real time for the current weld layer and making corrections for a next weld layer based on the current weld layer) can be implemented. Such a combined approach may result in a combination of course correction and fine correction that helps to keep the height of the layers more consistent with each other. For example, the approach of correcting in real time on the current layer may provide a course correction, and the approach of correcting on the next layer may provide a fine correction.

In one embodiment, a welding system is provided having a welding power source. The welding power source is configured to: sample, in real time, instantaneous parameter pairs of welding output current and wire feed speed during a robotic welding additive manufacturing process for creating a current weld layer of a 3D workpiece part; determine an instantaneous contact tip-to-work distance for, and based on at least, each parameter pair of the instantaneous parameter pairs sampled during creation of the current weld layer; determine an average contact tip-to-work distance based on each instantaneous contact tip-to-work distance determined for the current weld layer; and generate a correction factor to be used when creating a next weld layer of the 3D workpiece part based on at least the average contact tip-to-work distance. Each instantaneous contact tip-to-work distance may be determined in real time, and the welding power source may be further configured to: determine, in real time, a running average of contact tip-to-work distance as each instantaneous contact tip-to-work distance is determined during creation of the current weld layer; and adjust, in real time, one or more of a weld duration or a wire feed speed during creation of the current weld layer in response to the running average of contact tip-to-work distance. The instantaneous contact tip-to-work distance may be further based on one or more of welding output voltage, welding electrode type, welding electrode diameter, and shielding gas used. The correction factor may affect one or more of weld duration, wire feed speed, or travel speed for the next weld layer. The correction factor may be further based on one or more of 3D model parameters corresponding to the 3D workpiece part or robot parameters provided by a robot controller for a next weld operation for the next weld layer. The 3D model parameters and robot parameters may include one or more of a designated height of the next weld layer or a designated position of a welding tool for the next weld layer. The average contact tip-to-work distance may be one of a simple mathematical average of the instantaneous contact tip-to-work distances determined for the current weld layer, a weighted average of the instantaneous contact tip-to-work distances determined for the current weld layer, or a running average of the instantaneous contact tip-to-work distances determined for the current weld layer. The welding system may include a robot having a robot controller configured to operatively communicate with the welding power source. The welding system may include a welding tool operatively connected to the robot. The welding system may include a wire feeder operatively connected to the welding tool and the welding power source.

In one embodiment, a welding system is provided having a welding power source. The welding power source is configured to: sample, in real time, instantaneous parameter pairs of welding output current and wire feed speed during a robotic welding additive manufacturing process for creating a current weld layer of a 3D workpiece part; determine, in real time, an instantaneous contact tip-to-work distance for, and based on at least, each parameter pair of the instantaneous parameter pairs sampled during creation of the current weld layer; determine, in real time, a running average of contact tip-to-work distance as each instantaneous contact tip-to-work distance is determined during creation of the current weld layer; and adjust, in real time, one or more of a weld duration or a wire feed speed during creation of the current weld layer in response to the running average of contact tip-to-work distance. The welding power source may be further configured to: determine an average contact tip-to-work distance based on each instantaneous contact tip-to-work distance determined for the current weld layer; and generate a correction factor to be used when creating a next weld layer of the 3D workpiece part based on at least the average contact tip-to-work distance. The instantaneous contact tip-to-work distance may be further based on one or more of welding output voltage, welding electrode type, welding electrode diameter, and shielding gas used. The correction factor may affect one or more of weld duration, wire feed speed, or travel speed for the next weld layer. The correction factor may be further based on one or more of 3D model parameters corresponding to the 3D workpiece part or robot parameters provided by a robot controller for a next weld operation for the next weld layer. The 3D model parameters and robot parameters may include one or more of a designated height of the next weld layer or a designated position of a welding tool for the next weld layer. The welding system may include a robot having a robot controller configured to operatively communicate with the welding power source. The welding system may further include a welding tool operatively connected to the robot. The welding system may also include a wire feeder operatively connected to the welding tool and the welding power source.

In summary, a system and method to correct for height error during a robotic welding additive manufacturing process are provided. One or both of a welding output current and a wire feed speed are sampled during a robotic welding additive manufacturing process when creating a current weld layer. A plurality of instantaneous contact tip-to-work distances (CTWD's) are determined based on at least one or both of the welding output current and the wire feed speed. An average CTWD is determined based on the plurality of instantaneous CTWD's. A correction factor is generated, based on at least the average CTWD, which is used to compensate for any error in height of the current weld layer.

In appended claims, the terms "including" and "having" are used as the plain language equivalents of the term "comprising"; the term "in which" is equivalent to "wherein." Moreover, in appended claims, the terms "first," "second," "third," "upper," "lower," "bottom," "top," etc. are used merely as labels, and are not intended to impose numerical or positional requirements on their objects. Further, the limitations of the appended claims are not written in means-plus-function format and are not intended to be interpreted based on 35 U.S.C. §112, sixth paragraph, unless and until such claim limitations expressly use the phrase "means for" followed by a statement of function void of further structure. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A welding system, comprising a welding power source, wherein the welding power source is configured to:
   sample, in real time, instantaneous parameter pairs, where each instantaneous parameter pair of the instantaneous parameter pairs includes a welding output current and a wire feed speed, during a robotic welding additive manufacturing process for creating a current weld layer of a 3D workpiece part;
   determine an instantaneous contact tip-to-work distance for, and based on at least, each parameter pair of the instantaneous parameter pairs sampled during creation of the current weld layer;
   determine an average contact tip-to-work distance based on each instantaneous contact tip-to-work distance determined for the current weld layer; and
   generate a correction factor to be used when creating a next weld layer of the 3D workpiece part based on at least the average contact tip-to-work distance.

2. The welding system of claim 1, wherein each instantaneous contact tip-to-work distance is determined in real time, and wherein the welding power source is further configured to:
   determine, in real time, a running average of contact tip-to-work distance as each instantaneous contact tip-to-work distance is determined during creation of the current weld layer; and
   adjust, in real time, one or more of a weld duration or a wire feed speed during creation of the current weld layer in response to the running average of contact tip-to-work distance.

3. The welding system of claim 1, wherein the instantaneous contact tip-to-work distance is further based on one or more of welding output voltage, welding electrode type, welding electrode diameter, and shielding gas used.

4. The welding system of claim 1, wherein the correction factor affects one or more of weld duration, wire feed speed, or travel speed for the next weld layer.

5. The welding system of claim 1, wherein the correction factor is further based on one or more of 3D model parameters corresponding to the 3D workpiece part or robot parameters provided by a robot controller for a next weld operation for the next weld layer.

6. The welding system of claim 5, wherein the 3D model parameters and robot parameters include one or more of a designated height of the next weld layer or a designated position of a welding tool for the next weld layer.

7. The welding system of claim 1, wherein the average contact tip-to-work distance is one of a simple mathematical average of the instantaneous contact tip-to-work distances determined for the current weld layer, a weighted average of the instantaneous contact tip-to-work distances determined for the current weld layer, or a running average of the instantaneous contact tip-to-work distances determined for the current weld layer.

8. The welding system of claim 1, further comprising a robot having a robot controller configured to operatively communicate with the welding power source.

9. The welding system of claim 8, further comprising a welding tool operatively connected to the robot.

10. The welding system of claim 9, further comprising a wire feeder operatively connected to the welding tool and the welding power source.

11. A welding system, comprising a welding power source, wherein the welding power source is configured to:
sample, in real time, instantaneous parameter pairs, where each instantaneous parameter pair of the instantaneous parameter pairs includes a welding output current and a wire feed speed, during a robotic welding additive manufacturing process for creating a current weld layer of a 3D workpiece part;
determine, in real time, an instantaneous contact tip-to-work distance for, and based on at least, each parameter pair of the instantaneous parameter pairs sampled during creation of the current weld layer;
determine, in real time, a running average of contact tip-to-work distance as each instantaneous contact tip-to-work distance is determined during creation of the current weld layer; and
adjust, in real time, one or more of a weld duration or a wire feed speed during creation of the current weld layer in response to the running average of contact tip-to-work distance.

12. The welding system of claim 11, wherein the welding power source is further configured to:
determine an average contact tip-to-work distance based on each instantaneous contact tip-to-work distance determined for the current weld layer; and
generate a correction factor to be used when creating a next weld layer of the 3D workpiece part based on at least the average contact tip-to-work distance.

13. The welding system of claim 11, wherein the instantaneous contact tip-to-work distance is further based on one or more of welding output voltage, welding electrode type, welding electrode diameter, and shielding gas used.

14. The welding system of claim 12, wherein the correction factor affects one or more of weld duration, wire feed speed, or travel speed for the next weld layer.

15. The welding system of claim 12, wherein the correction factor is further based on one or more of 3D model parameters corresponding to the 3D workpiece part or robot parameters provided by a robot controller for a next weld operation for the next weld layer.

16. The welding system of claim 15, wherein the 3D model parameters and robot parameters include one or more of a designated height of the next weld layer or a designated position of a welding tool for the next weld layer.

17. The welding system of claim 12, wherein the average contact tip-to-work distance is one of a simple mathematical average of the instantaneous contact tip-to-work distances determined for the current weld layer, a weighted average of the instantaneous contact tip-to-work distances determined for the current weld layer, or a running average of the instantaneous contact tip-to-work distances determined for the current weld layer.

18. The welding system of claim 11, further comprising a robot having a robot controller configured to operatively communicate with the welding power source.

19. The welding system of claim 18, further comprising a welding tool operatively connected to the robot.

20. The welding system of claim 19, further comprising a wire feeder operatively connected to the welding tool and the welding power source.

* * * * *